United States Patent Office 3,138,553
Patented June 23, 1964

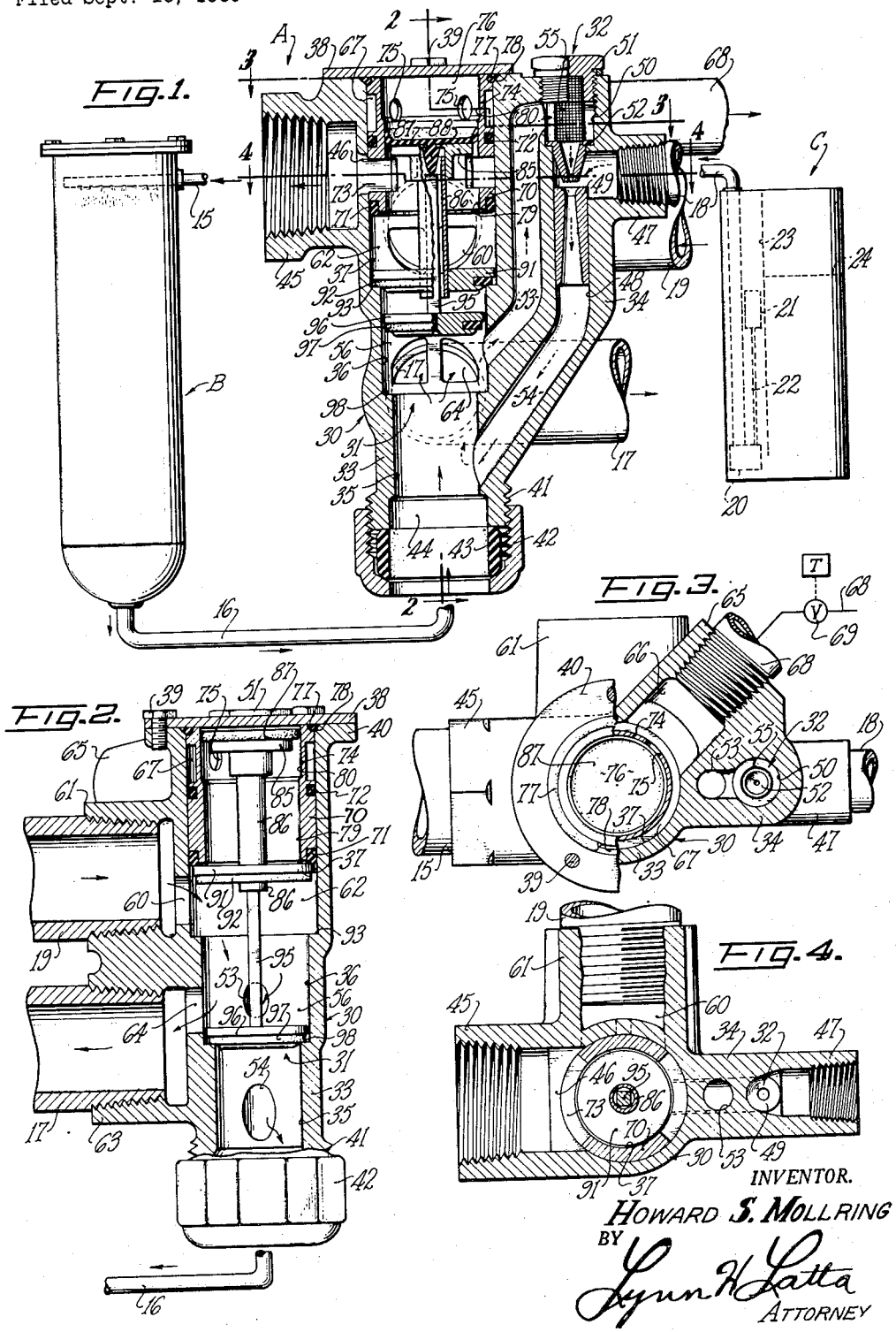

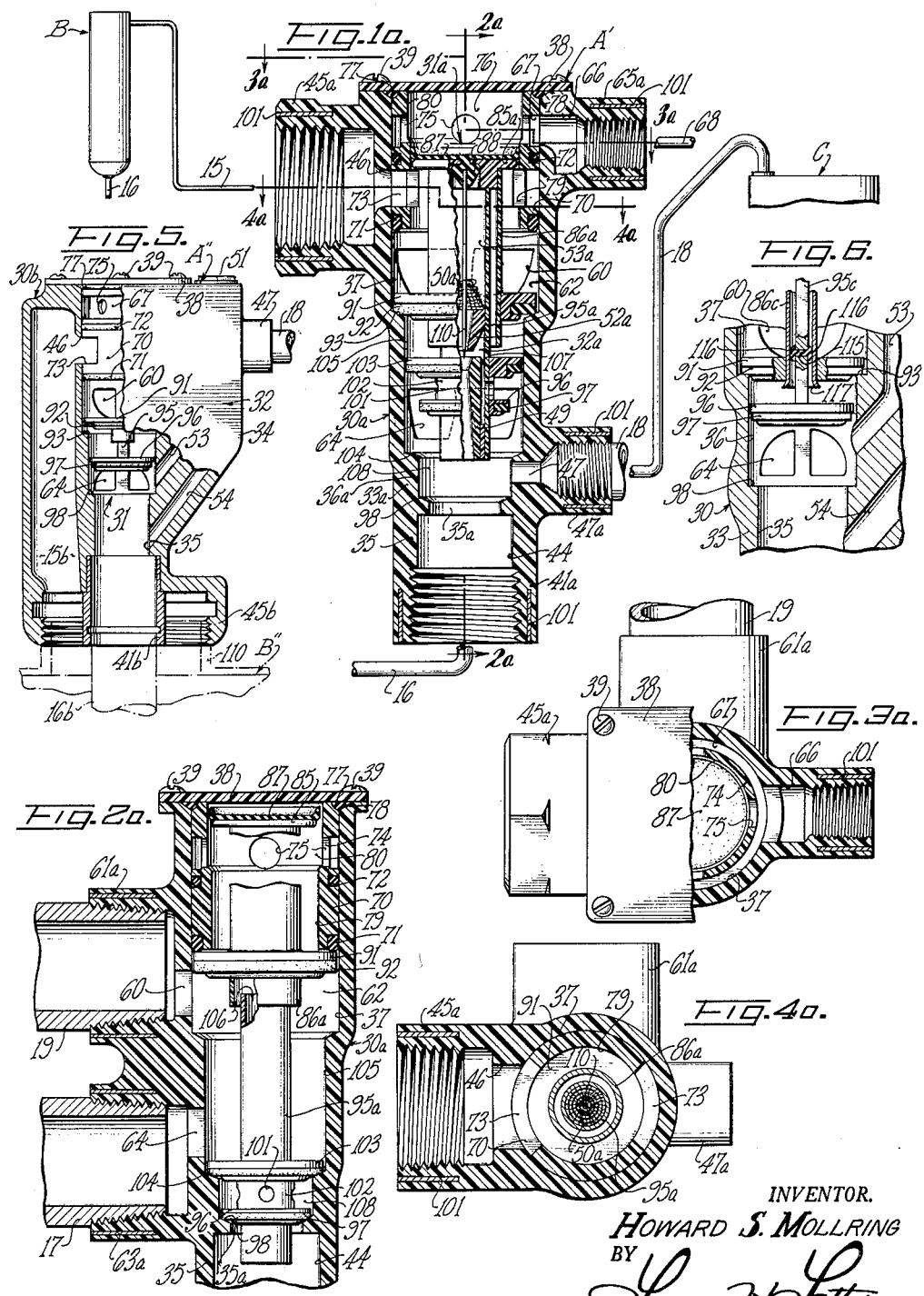

3,138,553
AUTOMATIC CYCLING VALVE FOR FLUID TREATMENT SYSTEMS
Howard S. Mollring, 131 N. Hamilton Drive, Beverly Hills, Calif.
Filed Sept. 16, 1960, Ser. No. 56,435
9 Claims. (Cl. 210—134)

This invention relates to automatic regenerating valves for water softener systems, and has as its general object to provide a valve that will operate automatically, in response to opening of a drain line pilot valve, to effect a stage of regenerating action in which the mineral bed in a conventional softener tank is regenerated by brine or an equivalent regenerating solution, and, in response to closing of the pilot valve, will restore the softener apparatus to a normal servicing operation in which hard water from a water main is routed through the valve to the softener tank thence back through the valve to the service line leading to the soft water faucets of the plumbing systems serviced by the softener apparatus.

A general object of the invention is to provide an improved and simplified automatic valve construction characterized particularly by axial alignment of operating parts, close coupling and relative short strokes of such operating parts.

A particular object of the invention is to provide an automatic control valve wherein the operating parts are solely responsive to water pressure differentials within the valve and are completely independent of gravity in their operation. Correspondingly, the invention provides a valve wherein the weight of the operating pistons is relatively immaterial. Thus the valve and its parts can be fabricated from light-weight materials such as synthetic resin plastic materials, with corresponding advantages derived therefrom. Furthermore, the invention makes it possible for the valve to operate in a normal upright position or in a horizontal or even in an inverted position, since the gravity response of the operating parts is not a factor in their operation.

A further object is to provide an automatic control valve wherein the operating parts, if temporarily stuck for any reason (such as the wedging of a foreign particle between a piston and its cylinder) will be forcibly moved to alternate positions when cycling action proceeds from one stage to another, thus assuring the dependable operation of the valve.

A further object is to provide, in such an automatic control valve, an improved arrangement of operating parts including a pressure differential responsive control piston or head for controlling the flow of hard water entering the valve from a hard water line so as to direct it selectively to the softener tank in normal service operation and bypassing it to the service line during the regeneration stage; together with a check valve, slidably coupled to and coaxial with said control head, for assisting in the control of the flow to the brine injector apparatus during regeneration and cutting off the brine injector apparatus during normal service operation; together with a surge piston or head, coupled to the control head, operative in the presence of line surges to hold it in service position, also operative to assist the control head in moving to regeneration position when the drain line is opened, and directing flow from the softener tank to the drain line during regeneration, said heads being closely coupled in axial alignment, whereby certain disadvantages of existing automatic valves having a check valve laterally displaced from its other heads, are eliminated.

A further object is to provide, in a valve having a control head and a surge head coupled thereto, an arrangement wherein line pressure applied between the two heads will establish a pressure differential against the control head because of a larger diameter therein, so that the control head will control over the surge head in moving to a closed service position under pressure drop across the tank.

A further object of the invention, in a modified form, is to provide an automatic valve which, in addition to the features outlined above, has an injector apparatus which likewise is coaxial with the operating heads of the valve, with improved and simplified construction and more efficient operation resulting therefrom.

Other objects and advantages will become apparent in the ensuing specifications and appended drawing in which:

FIG. 1 is a schematic system diagram of a water softening apparatus embodying the invention, with my improved automatic control valve shown in axial section;

FIG. 2 is an axial sectional view of the valve in a plane at right angles to FIG. 1 as indicated by line 2—2 of FIG. 1;

FIG. 3 is a top plan view partially in horizontal section as indicated by the line 3—3 of FIG. 1;

FIG. 4 is a transverse horizontal sectional view taken in a lower plane, as indicated by the line 4—4 of FIG. 1;

FIG. 5 is a vertical sectional view of a control valve embodying a modified form of the invention;

FIG. 6 is a detail sectional view of a modified form of the check valve;

FIG. 1a is a schematic diagram of a softener system embodying another modified form of my control valve shown in axial section;

FIG. 2a is an axial sectional view of the valve of FIG. 1a taken in a plane normal to the plane of FIG. 1a, as indicated by line 2a—2a of FIG. 1a;

FIG. 3a is a top plan view partially in horizontal section taken on the line 3a—3a of FIG. 1a; and FIG. 4a is a transverse sectional view taken on the line 4a—4a of FIG. 1a.

*General Description of Arrangement in System FIGS. 1–4*

Referring now to the drawings in detail, and in particular to FIGS. 1-4, I have shown therein as an example of one form in which the invention may be embodied, a water softener control valve, indicated generally at A, for use in a water softening system embodying a softener tank B connected to the valve A by a tank top distributor line 15 leading from the valve to a spray head in the upper end of tank B; and by a tank bottom collector line 16 leading from the tank back to the valve, for delivery of softened water through the valve to a service line shown at 17. The system also includes a regeneration fluid tank C for brine or other regenerative fluid, which is connected by a brine (regenerating) line 18 to the injector section of the valve. During normal service operation, hard water is delivered to the valve through a hard water supply line 19, is directed through the valve to top distributor line 15, is softened while passing downwardly through the tank, returns to the valve through bottom collector line 16, and is directed through the valve to service line 17, which leads to soft water faucets in a plumbing system serviced by the softener apparatus. Though forming no part of the present invention (and therefore illustrated in phantom) to facilitate an understanding of the operation of the valve in the system, it may be noted that the brine line 18 may extend downwardly within tank B to a brine valve 20 which is controlled by a float 21 connected to the valve by a stem 22 within a partitioned chamber 23 of the tank C; the chamber 23 being filled with fresh water at the end of a regenerating cycle, and such water passing through an opening at the lower end of partition 23 into the main compartment of the tank C containing a body of rock salt or brine concentrate 24; and that upon application of suction to the line 18, a quantity of brine will be withdrawn from the tank in accordance with conventional practice until the brine solution standing in the body of rock salt is evacuated, or until the actuation of the valve 20 shuts off the withdrawal after the measured quantity has been withdrawn. At this point it may also be noted that the invention could also utilize a pressure type of brine injection wherein the opening of a valve would result in the injection of brine from a pressurized tank; or as a further alternative, brine could be fed to the valve A from the brine tank by a pump.

*Detailed Description of Valve*

*Valve body.*—Valve A, in general, comprises a valve body, indicated generally at 30; a coaxial assembly of control and valve heads 31 therein; and an assembly of injector parts indicated generally at 32. The body 30 comprises a cylindrical barrel section 33, within which the assembly of heads 31 is contained, and an eccentric lateral body section 34 containing the injector assembly 32. Within the barrel section 33 is a series of consecutively larger cylindrical bores including a lower bore 35, an intermediate counterbore 36, and an upper counterbore 37 which is closed at its upper end by any suitable capping means which could be a male plug threaded therein, or, as shown, a flat cap 38 secured as by cap screws 39 to a head flange 40 on the upper end of barrel 33. At its lower end, barrel 33 is provided with suitable coupling means which could be an internally threaded throat or can, as shown, be an externally threaded neck 41 onto which is threaded a coupling nut 42 to constitute, with a suitable compressible sleeve gasket 43, a coupling gland in which the end of the collector line 16 is secured and sealed. A collector port 44 is defined within neck 41, in direct communication with bore 35.

At its upper end, barrel 33 has an integral coupling neck 45 to which tank top line 15 is coupled and communicates, through a tank top port 46, with one side of upper counterbore 37 at a point circumferentially spaced from the injector assembly 32 (e.g., diametrically opposite as shown). At the opposite side of valve body 30, projecting outwardly from lateral body section 34, is a brine line coupling neck 47 which provides any suitable means for coupling the end of brine line 18 thereto (e.g., by means of the internal thread shown therein). Coupling neck 47 communicates with a bore 48 in the upper outer portion of body section 34, a venturi sleeve 49 being mounted in the bore 48 and extending in its upper end into the throat of neck 47. In the end portion of lateral body section 34, projecting beyond neck 47, is a counterbore 50 closed by a stopper plug 51 at its outer end and mounting an injector nozzle 52 which projects into the throat of neck 47 through the upper end of bore 48. Formed in the lateral body section 34, between the bore 48 and the barrel 33, is an injector passage 53 the upper end of which communicates with counterbore 50 and the lower end of which is bent inwardly and communicates with counterbore 36 of barrel 33. A return passage 54 is formed in the lateral body section 34 as a continuation of bore 48 and extends diagonally inwardly to communicate with the bore 35 of barrel 33. Within counterbore 50 is a screen 55 which is confined between the upper end of jet 52 and the lower end of plug 51 and extends entirely across the ports at the upper end of passage 52 where it communicates with counterbore 50. Screen 55 protects the small orifice of jet 52 against being clogged by algae or foreign particles flowing through passage 53 during a regeneration cycle.

A transfer chamber 56 is defined in the lower area of counterbore 36.

Referring now to FIG. 1 and FIG. 4, valve body 30 at its upper end includes a semi-circular hard water inlet port 60 (FIG. 1) at the inner end of a neck 61 extending radially from counterbore 37 transversely to the axis of brine inlet neck 47 and projecting radially as an integral extention of barrel 33. The hard water inlet port 60 communicates with a control chamber 62 which is defined in the lower area of counterbore 37. Neck 61 is provided with suitable means (e.g. internal threading shown in FIG. 4) for coupling thereto one end of hard water line 19 coming from a water main. Below the coupling neck 61, and disposed in a common vertical plane of the barrel axis (FIG. 2) is a coupling neck 63 to which the service line 17 is coupled. A service outlet port 64 of semicircular form (FIG. 1) provides for the flow of water from a transfer chamber 56 to the service line 17. Necks 61 and 63 are disposed on the rear side of the valve as seen in FIG. 1; and although the lines 17 and 19 are shown in FIG. 1 as extending laterally from the axis of neck 61 (as having made right angle bends from the end portions coupled to necks 61 and 63) it will be understood that this is merely a schematic showing for the purpose of illustration and that normally they would project to some distance radially from the barrel 33 behind the same as viewed in FIG. 1.

At its upper end, valve body 30 has another coupling neck 65 (FIG. 3) which may be formed integrally with the rear side of lateral body section 34 as viewed in FIG. 1 and, as shown in FIG. 3, may extend at an acute angle to the axis of brine inlet neck 47. A drain outlet 66, at the inner end of neck 65, communicates with an annular drain chamber 67 in the upper area of counterbore 37. Neck 65 is provided with suitable means (e.g. internal thread) for coupling thereto a drain line 68 as shown fragmentarily in FIG. 3. Drain line 68 is provided with a pilot valve 69 which can be manually operated (e.g. for large industrial installations); or can be operated by a hand-set timer, schematically indicated at T in FIG. 3, for a semi-automatic operation; or which can be operated by a combination of electric clock and solenoid, or a motor driven valve or a hydraulic ram driven valve, for fully automatic installations of various types. The valve 69, when opened, initiates the regeneration cycle of the apparatus.

*Liner sleeve.*—Mounted in the upper area of counterbore 37 is a liner sleeve 70 including a thick-walled lower section sealed to the counterbore 37 by gaskets 71 and 72 mounted in annular grooves therein, and having a series of circumferentially spaced ports 73 located between the gaskets 71 and 72 (and thereby sealed off at times from chambers 62 and 67) any one of said ports 73 being adapted to register with the tank top port 40 of barrel 33 (thus eliminating the necessity for rotative orientation of the sleeve during assembly). The sleeve 70 further includes an upper portion having a fairly wide external annular groove which, with the upper portion of counterbore 37, defines the annular drain chamber 67, leaving a thin walled sleeve section 74 which likewise is provided with a series of circumferentially spaced ports 75 establishing communication between the annular chamber 67 and a surge chamber 76 which is defined within the upper sleeve portion 74.

Gasket 71 is of oval cross section and projects below the lower end of sleeve 70 to provide a valve seat (bypass seat).

In the upper end of sleeve 70 is a third annular groove in which is seated a gasket 77. Gasket 77 is extruded by pressure applied by cap 38 beyond the diameter of counterbore 37, into engagement with a countersink shoulder 78 in barrel 33 at the upper end of counterbore 37, and the groove at the upper end of sleeve 70 is undercut at said upper end so that said upper end overhangs and is supported upon the gasket 77. At the same time, the gasket 77 seals the cap 38 and also the upper end of sleeve 70 to the upper end of barrel 33.

In its lower portion, sleeve 70 has a bore 79. In its upper portion 74, it has a counterbore 80 of slightly larger diameter than bore 79.

*Control head assembly 31* includes at its upper end a surge head 85. A tubular upper stem 86 has its upper end secured in the head 85 (or integrally joined thereto as by integral molding or casting of stem and head as a single part). The periphery of head 85 is preferably of substantially smaller diameter than the bore 79 of sleeve 70, leaving an annular fluid-flow clearance space (although the invention is likewise satisfactorily operative where head 85 makes a fairly close fit in bore 79). Seated against the flat upper face of head 85 is a packing cup 87 of highly flexible material such as soft rubber, equivalent synthetic rubber, or synthetic resin plastisol material or the like, the flat bottom of the cup 87 being free of attachment to the head 85 except at its center where it has an integral male fastener element 88 of dart form, joined to the flat bottom of cup 87 by a reduced neck which is received in a central aperture in head 85, said aperture being of smaller diameter than the internal diameter of tubular stem 86 and defined by a small, thin annular flange, which is locked in the annular groove surrounding the reduced neck of fastener element 88, whereby the cup is secured snugly against the center of head 85. The fastener element 88 is sufficiently compressible so that it can be forced through the narrow aperture in head 85 for assembling the cup 87 to the head. Fastener element 88 further functions as a bumper as will be described more in detail hereinafter.

The control head assembly 31 further includes a control head 91 having an annular peripheral groove in which is mounted a flat valve washer 92, positioned to seat against a flat radial annular valve seat shoulder 93 formed as an offset between counterbores 36 and 37. The annular lip of head 91 which defines the lower side of its peripheral groove is sufficiently small in diameter to have substantial radial clearance within counterbore 36, so that washer 92 may seat against shoulder 93 without interference.

As an important feature of the invention, the control head 91 has an effective area larger than that of surge head 85, thus providing a differential in the effective pressure exerted downwardly against head 91 by line pressure from hard water line 19, in control chamber 62, over that exerted upwardly against surge head 85. The difference in radius of these heads is accounted for by the thickness of the lower portion of sleeve 70. Thus the sleeve 70 functions to provide the bore 79 of reduced diameter within counterbore 37 and also to provide the annular chamber 67 which connects the upper end of bore 79 to the drain outlet 66.

The control head assembly 31 further includes a check valve comprising a stem 95 which is loosely telescoped and guided within tubular stem 86, and a poppet head 96 joined to the lower end thereof. Poppet head 96 is similar in construction to control head 91 in that it has an annular peripheral groove in which is mounted a valve seat washer 97 which is positioned to seat against an annular radial valve seat shoulder 98 formed as an offset between bore 35 and counterbore 36.

*Operation*

*Normal service operation* is in effect when control valve A is closed, permitting pressure to build up in surge chamber 76 by upward flow from control chamber 62, past packing cup 87, until pressure in chambers 62 and 76 is equalized. Line pressure is applied to control chamber 62 through hard water line 19 and inlet port 60, and is applied to the upper side of control head 91 and also to tank top line 15 (through the open lower end of sleeve 70, its ports 73, port 46 and line 15). This line pressure is also applied to the lower side of surge head 85 and the periphery of its sealing cup 87, but the above mentioned differential of effective areas as between control head 91 and surge head 85 results in a net downward pressure against control head 91 when service line 17 is open at a faucet or other outlet. Utilizing this net downward pressure, control head 91 will seek and be maintained in its lowered, closed position by a pressure differential which exists between tank top line 15 and distributor line 16 due to the flow resistance of the mineral bed within tank B. Control head 91, in its lowered position, shown in FIG. 1, will be sealed against valve seat 93 under line pressure from hard water line 19 against its upper face, and by the pressure exerted against surge head 85 by water trapped in surge chamber 76, with sealing cup 87 sealed to the wall of counterbore 79. When a service faucet is open and water is flowing in service line 17 the check valve poppet 96 will be supported in the raised position approximately as shown in FIG. 1, by the flow of water from the bottom collector line 16 upwardly through the bottom of the valve into outlet chamber 83 and thence through outlet port 82 into service line 17.

In the raised position of check valve 96, communication between the bottom inlet 44 of the valve and the service line 17 is established from the upper end of bore 35 through port 64.

When all faucets are closed and water is not flowing in service line 17, check valve 96 may sink to the lowered position shown in FIG. 2, in which it may seat by gravity against valve seat 98, and in which transfer chamber 56 communicates with service line 17 through outlet port 64. However, immediately upon the opening of a faucet, the pressure in service line 17 and consequently in transfer chamber 56, will be lowered below the pressure in bottom collector line 16 (which will have become substantially equalized with line pressure because of lack of flow through tank B) and the line pressure thus applied to the lower side of check valve 96 will quickly raise it back to the elevated position.

When an open faucet is closed abruptly so as to produce a surge in the service line 17 (sometimes referred to as "hammer") with a resulting increase in pressure in chamber 56, which pressure in many instances will be approximately a 90 percent increase over line pressure, the tendency of control head 91 to be unseated upwardly will be effectively resisted by the incompressibility of the water in the surge chamber 76, acting downwardly against surge head 85 which is sealed to counterbore 79 by the flexible feathered lip of cup 87. Thus the control head 91 is securely held seated in its closed position during surges.

The invention further provides for the relief of back pressure in service line 17, above normal line pressure, such as may be created by an overheated hot water heater at a time when all faucets are closed and check valve head 96 is consequently seated in its lowered position against seat 98, thus cutting off any path of escape of such excess pressure from the chamber 56 downwardly through inlet 44 and back through tank B (or upwardly past seated control head 91, held closed by surge head 85 as above described). In the event this occurs, the excess pressure will escape from chamber 56 through injector passage 53, nozzle 52, venturi 49 and injector passage 54 to the inlet 44 and thence back through tank B.

*Regeneration operation* is initiated by opening pilot valve 69, which bleeds off the pressure in the surge chamber 76 into drain line 68. The upward pressure differential thus developed by line pressure in control chamber 62 over the reduced pressure in surge chamber 76 will quickly be relieved by upward flow of water from chamber 62 around the periphery of surge head 85 and past the rim of packing cup 87 (which, being highly flexible, yields upwardly and inwardly to open the annular passage between head 85 and the wall of bore 79) and will escape through port 75 into the open drain line. The differential of line pressure below control head 91 over the reduced pressure in control chamber 62 will then rapidly raise the head 91 to its upward position seated against the downwardly protruding valve seat portion of gasket 71, thus sealing the high pressure in control chamber 62 and holding the control head 91 in the raised position throughout the regenerating cycle. At the same time, in the event check valve 96 should at this time be raised (e.g., if it should happen to be stuck in its raised position) the line pressure above the check valve poppet 96 will establish a differential over the pressure in the bottom inlet 44 of the valve (which will have been equalized with the low pressure in control chamber 62 through the tank B) and the check valve will thereby be forced downwardly to its normal lowered position.

With the control head 91 raised and the check valve 96 lowered as shown in FIG. 2, a bypass flow path is thus provided in the counterbores 36 and 37 from the hard water inlet line 19 through port 60 (now disposed below the raised control head 91) thence downwardly to the port 64 (disposed above the lowered check valve poppet 96) and thence directly out to the service line 17, providing hard water service during the regenerating cycle.

At the same time, a small portion of the bypass flow will be diverted upwardly through injector inlet passage 53 to injector nozzle 52, thence downwardly through venturi 49 and injector outlet passage 54 to the bottom port 44 of the valve, thence in a back-flow through collector line 16 into the bottom of the tank B, thence upwardly through the tank for regeneration of the mineral bed therein, thence through the top distributor line 15 back to the valve and into the lower end of sleeve 70 through ports 46 and 73, thence upwardly and through ports 75 to drain line 68. During the initial stage of this regeneration flow, brine (or other regenerating fluid) will be drawn through brine line 18 and port 47 into injector passage 54 by the aspirating action between nozzle 52 and venturi 49. When the predetermined quantity of brine has been withdrawn from brine tank D and the valve 20 has closed, the injection of brine into the regenerating flow will stop and the continued regenerating flow will function to flush out the brine residue from the mineral bed so as to complete the preparation of the softener system for further service action. The regenerating cycle is terminated by closing the valve 69, either manually or by timer action, whereupon line pressure will rapidly equalize throughout the system, through the lines 16 and 15. Control head 92 and surge head 85 may then sink by gravity back to their normal service positions shown in FIG. 1. However, the invention does not require such operation, but on the contrary, provides for positive return of these heads to their service positions the first time a faucet is opened after regeneration. Such opening of a faucet will drop the pressure in service line 17 below the line pressure existing in other portions of the system creating a differential of pressure in control chamber 62 over the pressure in transfer chamber 56 and quickly forcing the control head 91 downwardly to its service position closed against valve seat 93. It is the differential of high pressure in distributor line 15 over the momentarily reduced pressure in service line 17 which rapidly forces the head 91 downwardly. The surge head 85 will be drawn downwardly with head 91 by stem 86. During such downward movement of head 85, tending to create a vacuum in surge chamber 76, high pressure water in chamber 62 will force its way upwardly past head 85 (the rim of cup 87 yielding upwardly as previously described) into the surge chamber 76. The initial movement of cup 87 downwardly is facilitated by the relatively loose fit of its rim in the enlarged counterbore 80 at the upper end of bore 79. As the cup moves downwardly into the more constricted bore 79, it becomes tightly seated against the wall thereof, so as to effectively seal the surge chamber 76 to provide its surge resisting action previously described. The loose fit in counterbore 80 further functions to prevent the rim of cup 87 from establishing a "suction cup" attachment to the upper end of sleeve 70 when in its raised position, which attachment would of course resist the downward return of the surge head to its normal position, as well as resisting the last stage of upward movement of the surge head after passing the ports 75.

The invention provides an improved coaxial arrangement of moving heads including a poppet type check valve, closely coupled, for maximum sensitivity of response to pressure differentials. Close coupling is facilitated by extending the guide stem of the check valve upwardly and guiding it in the tubular stem of control head 91 and surge head 85. Although it would be possible to utilize a guide in the bore 35 for guiding the check valve, my improved arrangement has the advantage of leaving the bore 35 unobstructed. The close-coupled coaxial arrangement of the check valve has the advantage of placing the valve coaxially and directly in the line of flow downwardly from inlet 62 to outlet 64 during regeneration.

If the valve should become stuck in the up position, the bypass flow will pass the periphery of the valve with a positively downward dragging movement which forces the valve to the closed position as contrasted to the action of a conventional check valve wherein the water can flow by the check valve if it is stuck in the open position. The spacing between the periphery and the check valve bore wall is about .020 inch and the downward drag in this operation is exerted all around the periphery of the valve. Also, the pressure differential of the bypass flow will be applied to the upper face of the check valve head at right angles to the upper face thereof.

The invention is further characterized by the larger area of the control head 91 than the other heads, making it responsive to downward pressure differential developed by pressure drop in tank B in service operation, and positively closing it in the service position without requiring the assistance of gravity. Thus it can be made of lightweight synthetic resin materials with attendant advantages. It will operate on a horizontal axis or even in an inverted position, should conditions of installation require it. The sustaining effect of liquid trapped in the surge chamber will hold it in service position under all such conditions of installation.

*Detailed Description—Modified Form—FIGS. 1a–4a*

Referring now to FIGS 1a–4a inclusive, there is shown therein a modified form of the invention wherein the features of construction and operation embodied in the structure of FIGS. 1–4 are almost entirely duplicated in this modified construction, the chief difference being in the coaxial arrangement of the injector apparatus 32a with respect to the control head assembly 31a, as contrasted to the eccentric arrangement of the injector apparatus 32 of FIG. 1. The coaxial arrangement of FIGS. 1a–4a makes it possible to fabricate the valve entirely of injection molded plastic parts, which I find to be quite suitable for operation, just as efficient as the operation of the assembly of chiefly metal parts in FIGS. 1–4; and which has a very decided advantage thereover in that the problems of electrolysis and corrosion resulting therefrom in the metal valve, are completely eliminated.

To avoid unnecessary duplication of description, parts in the modified form which correspond to parts in the form of FIGS. 1–4 are designated by the same reference numerals and will be understood to be arranged and operative in accordance with the description of FIGS. 1–4. Parts corresponding generally to those of FIGS. 1–4 but somewhat modified, are indicated by corresponding numerals with the addition of the reference letter "a." Referring first to these generally corresponding but modified parts, it may be noted that in each of the coupling necks 19a, 41a, 45a, 61a, 63a and 65a (which here are fabricated of synthetic resin plastic material) reinforcements to resist the tendency of these necks to split when strains are imposed thereon by the various connections set up in the installed apparatus, are provided by reinforcing ferrules 101 which are inserted in annular coaxial recesses therein and tightly held by shrinkage of the resin thereagainst.

Also, it may be noted that the brine inlet neck 47, instead of being at the top of the valve, is located at the lower end thereof, and its location in FIG. 1 is taken by the drain outlet neck 65a.

To accommodate the combined check valve and injector assembly 32a in coaxial relation to the control head assembly 31a, the stem 86a of upper control head 85a is enlarged in diameter, and the check valve stem 95a is tubular and of sufficient diameter to accommodate therein and function as the casing for the injector nozzle 52a and a venturi 49, which parts are mounted within the tubular stem 95a with a press fit therein, to secure them in their properly related positions. The tubular stem 95a now defines in its upper end portion, the passage 53a into which water entering control chamber 62 through hard water inlet 60, when control head 91 is raised as in FIG. 2a, may flow through the lower end of tubular stem 86a into the upper end of tubular stem 95a as indicated by arrow 106 of FIG. 2a, and will then flow downwardly through nozzle 52a. The suction thus developed between the nozzle 52a and venturi 49 is applied to an annular chamber 107 defined between the periphery of the upper end portion of venturi 49 and the surrounding portion of stem 95a, and thereby brine is drawn from the brine line 18, through neck 47a and chamber 108, into the annular chamber 107 through a plurality of registering ports 101 in the stem 95a and in a short collar 102 which joins the check valve head 96 to a second check valve head 103 which is spaced upwardly from the valve head 96 and of larger diameter, so that it may seat upon an annular valve seat 104 in barrel 33a, simultaneously with the seating of check valve head 96 against its seat 98. In order that the lower check valve head 96 may pass by the valve seat 104, the counterbore 36a is relatively shallow axially, and an additional counterbore 105 is provided between the counterbore 36a and the counterbore 37, the valve seat 104 being defined at the lower end of counter bore 105. Thus the valve seat 104 is of larger diameter than valve seat 98 and the upper check valve head 103 is of correspondingly larger diameter than head 96.

Supported within stem 95a immediately above nozzle 52a and positioned thereon, is a screen 50a.

The additional check valve head 103 is provided for the purpose of sealing off an annular chamber 108 within the counterbore 36a and between the valve seats 104 and 98 and the check valve heads seated thereon, as in FIG. 2a. Thus the suction developed by the injector venturi 49 is applied to the chamber 108 to effectively draw the brine into the valve through the brine line 18, and the mixture of brine and water is discharged from the lower end of stem 95a axially into the center of distribution port 44.

Secured in the male fastener element 88 of packing cup 87, and projecting downwardly through the nozzle 52a when the parts are in the normal service position shown in FIG. 1a, is a nozzle-clearance needle 110. When the control head 91 is in the raised regeneration position of FIG. 2a, the needle 110 will be withdrawn upwardly with respect to nozzle 52a. When the control head 91 returns downwardly to the service position of FIG. 1a, it will effect the penetrating movement of the needle 110 through the aperture of nozzle 52a with an automatic clearing action which maintains the nozzle 52a at maximum operating efficiency.

The operation of the valve of FIGS. 1a–4a, with respect to the response of control head 91 to varying pressure differentials arising when the drain line 68 is shut off and, later, when it is reopened, is exactly the same as in the operation of the valve of FIGS. 1–4 and need not be reviewed. The operation of the injector apparatus may likewise be the same as in the valve of FIGS. 1–4, with the exception that the flow paths are modified in accordance with the modified position of the injector apparatus.

*Modified Form—FIG. 5*

FIG. 5 illustrates another modified form of the invention, wherein the valve A″ is mounted directly on the top of a tank B″, shown in phantom. It differs from the valve of FIGS. 1–4 principally in having the top distributor line 15b formed integrally as a passage in valve body 30b and communicating at its lower end with an annular fitting 45b which is provided with suitable means, such as the internal thread shown, for coupling it to a nipple 110 on tank B″. Fitting 45b surrounds a neck 41b to define an annular port communicating with the distributor spray head of the tank.

Neck 41b is adapted to be coupled to the upper end of a collector line 16b extending downwardly through the tank B″ to the bottom thereof, for drawing off the softened water therefrom in normal service operation of the system. The injector apparatus 32, as indicated, may be the same as in FIG. 1, and the control head assembly 31 may likewise be the same as in FIG. 1. Alternatively, the internal operating mechanism may be the same as that shown in FIG. 1a.

*Modified Form—FIG. 6*

FIG. 6 illustrates an improved form of the check valve feature, wherein a frictional holder comprising a stem 15 mounted in a transverse bore in check valve stem 95c, has at its respective ends, heads 116 adapted to enter the tubular stem 86c of control head 91 when check valve 96 is forced upwardly, and functioning as friction pads, engaging the internal wall of stem 96 with a light yielding engagement sufficient to hold the check valve in the open service position throughout a series of openings and closings of faucets in service line 17, restraining the check valve from dropping by gravity to its closed position when service line 17 is closed and not in use. This overcomes a slightly objectionable characteristic of most check valves, arising from the action of surges generated by closing of faucets. Such surges, which involve a surging of kinetic force or pressure back and forth in the body of water within the valve, will react upon a check valve by successively lifting it off its seat and dropping it back upon its seat with a slamming action accompanied by an audible hammer sound which is carried through the plumbing lines with an unpleasant effect. With the holding device 115, 116 in operation, the check valve will remain open throughout a service-operation period, and surges will pass by it without affecting it On the other hand, the holding action of holder 115, 116 is sufficiently light and yielding so that when the valve is shifted into its regeneration cycle, the downward pressure differential thereby imposed upon it will force it downwardly to its closed position, stripping the holder 115, 116 out of the stem 86c.

At its lower end, stem 86c has a bell mouth or chamfer 117 which guides the holder pads 116 into the stem 86c when the check valve is raised.

*Claim Terminology*

In the appended claims, the terms used therein, in their order of occurrence, refer to parts described above, as follows:

| Claim Terminology | Identification in Specification |
| --- | --- |
| Distributor port | Tank top port 46. |
| Collector port | Port 44. |
| Supply port | Hard water inlet port 60. |
| Service port | Service outlet port 64. |
| Control chamber | 62. |
| Transfer chamber | 56. |
| Drain port | Drain outlet 66. |
| Control seat | Valve seat shoulder 93. |
| Check valve seat | Valve seat shoulder 98. |
| Control head | 91. |
| Check valve poppet | Check valve 96. |
| Guide stems | 86 and 85. |
| Bypass seat | Gasket 71. |
| Bore | 35. |
| Intermediate Counterbore | 36. |
| Larger counterbore | Upper counterbore 37. |
| Sleeve | Liner sleeve 70. |
| Surge chamber | 76. |
| Surge head | 85. |

I claim:

1. A valve for controlling cycling operation of a fluid treatment apparatus, said valve comprising: a valve body having respective distributor and collector ports for connection to said apparatus, having supply and service ports and a drain port disposed beyond said supply port remote from said collector port, having control and transfer chambers communicating with said supply and service ports respectively, having a control valve seat disposed between said control and transfer chambers, having a surge chamber, of smaller diameter than said control chamber, in communication with said drain port, and having a bypass valve seat, in opposed, axially spaced relation to said control valve seat and disposed between said control and surge chambers; said drain port having means to close the same for effecting transition between stages of cycling action; control means comprising a control head in said control chamber and a surge head in said surge chamber, of smaller area than said control head and connected thereto in fixed axially spaced relation thereto for conjoint movement therewith, said control head being responsive to changes in differential between the pressures in said distributor and collector ports respectively, moving to a service position closed on said control seat in response to pressure drop at said collector port when said drain port is closed, thereby connecting said supply ports to said distributor port through said control chamber for directing fluid through said distributor port and, in response to pressure drop in said drain port when the latter is open, moving to a bypass position closed on said bypass seat, wherein said supply port is connected through said control chamber to said service port for bypass flow to said service port and said distributor port is isolated from said supply port; and one-way flow-control means on said surge head for permitting flow past said surge head from said control chamber to said surge chamber and operable, in response to pressure transmitted to said surge head from said control head, to trap in said surge chamber a body of water resisting movement of said control head away from said control seat when subjected to a surge in said transfer chamber while said drain port is closed.

2. A regenerating valve as defined in claim 1, wherein said valve body has at one end a bore defining said collector port, has an intermediate counterbore defining said transfer chamber, and has at its other end a larger counterbore defining said control chamber in an end thereof adjoining said intermediate counterbore, and including a sleeve mounted in the other end of said larger counterbore, said sleeve defining the lateral wall of said surge chamber and having, at its inner end opposite said control head, a reduced end spaced radially from the wall of said larger counterbore to define a ring groove, and a packing ring seated in said ring groove, sealing said inner end of the sleeve to said counterbore wall, and projecting beyond said inner end to constitute said bypass seat.

3. A regenerating valve for a water softener receiving hard water through a distributor line and delivering softened water through a collector line, said valve comprising: a valve body having respective distributor and collector ports for connection to said distributor and collector lines respectively, having supply and service ports for connection to supply and service lines respectively, having a closeable drain port disposed beyond said supply port, remote from said collector port, having control and transfer chambers communicating with said supply and service ports respectively, having a control seat disposed between said control and transfer chambers, having a surge chamber in communication with said drain port, and having a bypass seat, in opposed, axially spaced relation to said control seat and disposed between said control and surge chambers; and control means comprising a control head in said control chamber and a surge head in said surge chamber, means connecting said heads in fixed axially spaced relation for conjoint movement, said control head being of larger diameter than said surge head so as to be responsive to changes in differentials between the pressures in said distributor and collector ports respectively, moving to a service position closed on said control seat in response to high pressure in said supply port when said drain port is closed, thereby connecting said supply port to said distributor port through said control chamber for directing supply water to the softener, and, in response to pressure drop in said drain port when opened, moving to a bypass position closed on said bypass seat, wherein said supply port is connected through said control chamber to said service port for bypass flow of supply water to said service port during a regenerating cycle and wherein said distributor port is isolated from said supply port; a closure closing the end of said surge chamber opposite said surge head, and a packing cup of flexible material having a bottom seated on said surge head and centrally secured thereto, in opposed relation to said closure, and having a flexible rim projecting toward said closure and normally sealed to the wall of said surge chamber to trap therein a body of water resisting movement of said control head away from said control seat when subjected to a surge in said transfer chamber, said head having peripheral clearance in said surge chamber, and said packing cup rim being yieldable away from the wall of said surge chamber to permit flow of water past said surge head into said surge chamber in response to movement of said surge head toward said control chamber when said control head is being moved from its bypass position to its service position.

4. A regenerating valve for water softeners, comprising: a valve body having at one end a collector port, having at its other end a distributor port for connection to a softener distributor line and a drain port for connection to a pilot valve-controlled drain line, having regenerating, supply and service ports for connection to a regenerating line, to a hard water supply line, and to a faucet service line respectively, having a surge chamber communicating with said drain port, a control chamber communicating with said supply port, and a transfer chamber communicating with said service port and said collector port and coaxial with the latter, having a control valve seat between said control chamber and transfer chamber, and having a check valve seat between said transfer chamber and said collector port; injector means comprising an aspirator for drawing regenerating fluid through said regenerating line into the valve, an injector passage extending from said transfer chamber to said aspirator, and a return passage extending from the latter to said collector port, for delivering regenerating fluid thereto; and control means comprising a check valve poppet in said transfer chamber, movable axially between a closed position seated on said check valve seat, with said transfer chamber in communication with said service port and with said control chamber for bypassing hard water from said supply port to said service port, and an open position in which said transfer chamber communicates with said collector port, for flow of water from said collector port to said service line, a surge piston in said surge chamber, and a control head in said control chamber, a stem to which said surge piston and control head are secured, said control head being of larger diameter than said surge piston and said check valve poppet, whereby differentials of pressure in said distributor port over pressure in said collector port, due to pressure drop through the softener tank, when said pilot valve is closed, will be applied in said control chamber between said control head and said surge piston, and will be effective to move said control head to a service position closed against said control valve seat with said control chamber in communication with said distributor port and hard water supply port for flow of hard water from the latter into the distributor line, and whereby, when said pilot valve is open, a pressure drop will occur in said surge chamber such that said control head and surge piston will move to regenerating positions in which said control head will be unseated to establish said bypass hard water flow and to divert a part of said bypass flow into said injector passage to effect the flow of regenerating fluid in said return line; and a packing cup of flexible material including a bottom attached to said surge piston and a flexible rim projecting toward said drain port and normally sealed to the wall of said surge chamber so as to retain therein, when said pilot valve is closed, a trapped body of water holding said surge piston and control head in the closed position of the latter, resisting surges in said service line, said packing cup yielding to flow of water past said surge piston from said control chamber into said surge chamber when said control head is being moved from regenerating position to service position.

5. A regenerating valve as defined in claim 4, wherein said check valve stem is tubular, and wherein said injector means is disposed within said check valve stem.

6. A cycling valve as defined in claim 1, including cylindrical walls in said valve body, in adjoining end to end relation and cooperatively defining said surge chamber, one of said walls, nearest said control chamber, being of slightly smaller diameter than the other; said one-way flow control means comprising a flexible packing cup including a bottom mounted on said surge head within said surge chamber and a flexible rim projecting toward said drain port and normally engaging said smaller diameter wall with a substantially fluid-tight fit which is relaxed when said control head and surge head move to the bypass position, said packing cup being yieldable inwardly to permit flow of water past said surge head from said control chamber into said surge chamber when said drain port is open.

7. A cycling valve for a fluid treatment system comprising: a valve body having means defining axially spaced transfer and surge chambers, a control chamber disposed between and of larger diameter than said transfer and surge chambers and coaxial with the latter, a distributor chamber disposed between said control chamber and said surge chamber, and a collector chamber communicating with said transfer chamber at the end thereof remote from said control chamber; said valve body having an inlet port communicating with said control chamber, respective first and second outlet ports communicating with said transfer and surge chambers respectively, said second outlet port being normally closed by a pilot valve of said system, a collector port communicating with said collector chamber, and a distributor port communicating with said distributor chamber, said distributor and collector ports functioning to establish respective connections between said valve and a fluid treatment apparatus; said valve body further including first and second valve seats disposed in axially opposed relation at opposite axial extremities of said control chamber, with said first valve seat adjacent said transfer chamber and said second valve seat adjacent said distributor chamber; control means comprising a control head movable axially within said control chamber, a surge head axially movable in said surge chamber, and means connecting said surge head and said control head in fixed axially-spaced relation for conjoint movement, said control head being of larger diameter than said surge head and thereby responsive to changes in differentials between fluid pressures in said distributor and collector ports respectively, so as to move to a position closed against said first valve seat in response to drop in pressure in said first outlet port below high pressure in said inlet port when said second outlet port is closed and said first outlet port is opened, whereby said control chamber will connect said inlet port to said distributor port for directing through said treatment apparatus, fluid adapted to be returned to the valve through said collector port in one stage of cycling operation and whereby, in response to pressure drop in said surge chamber when said second outlet port is open, said control head will move to a by-pass position seated against said second valve seat, in which position said inlet port is connected through said control chamber to said first outlet port for bypass flow of fluid to said first outlet port during another stage of cycling operation; and one-way flow-control means on said surge head for permitting flow past said surge head from said control chamber to said surge chamber and operable, in response to pressure transmitted to said surge head from said control head, to trap in said surge chamber a body of water resisting movement of said control head away from said control seat when subjected to a surge in said transfer chamber while said second outlet port is closed.

8. A cycling valve for a fluid treatment system comprising: a valve body having means defining axially aligned and axially spaced transfer and surge chambers and a control chamber disposed between and of larger diameter than said transfer and surge chambers and coaxial therewith, said valve body further having a collector chamber communicating with said transfer chamber at the end thereof remote from said control chamber and a distributor chamber interposed between said control chamber and said surge chamber and coaxial therewith; said valve body having an inlet port communicating with said control chamber, respective first and second outlet ports communicating with said transfer and surge chambers respectively, said second outlet port having means for normally closing the same, a collector port communicating with said collector chamber, and a distributor port communicating with said distributor chamber; said valve body further including first and second valve seats disposed in axially opposed relation at opposite axial extremities of said control chamber, said first valve seat being adjacent said transfer chamber and said second valve seat being adjacent said distributor chamber, and a check valve seat disposed between said transfer chamber and said collector chamber; and control means comprising respective control and check valve poppets, independently movable axially within said control chamber and transfer chamber respectively, a surge head axially movable in said surge chamber, and a stem connecting said surge head to said control poppet in fixed axially-spaced coaxial relation for conjoint movement therewith, said control poppet being of larger diameter than said surge head and thereby responsive to changes in fluid pressure in said control chamber so as to move to a position closed against said first valve seat in response to high pressure in said control chamber over lowered pressure in said transfer chamber when said second outlet port is closed and said first outlet port is opened, whereby said control chamber will connect said inlet supply port to said distributor port for directing to said distributor port, fluid adapted to be returned to the valve through said collector port into said collector chamber in one stage of cycling operation; said control head, in response to pressure drop in said surge chamber when said second outlet port is open, moving to a bypass position seated against said second valve seat, in which position said supply inlet port is connected through said control chamber to said first outlet port for bypass flow of fluid to said first outlet port during another stage of cycling operation; said check valve poppet being responsive to pressure in said inlet port when said second outlet port is closed and said control head is in said bypass position, to move into engagement with said check valve seat so as to isolate the collector port from said first outlet port and to connect said first outlet port to said inlet port for establishing said bypass flow, and being responsive to pressure in said collector chamber when said second outlet port is open and said control poppet is in said service position, to move to an unseated position in which said collector port is connected to said first outlet port through said distributor chamber, for flow of fluid from said collector port to said first outlet port, said control poppet being adapted to seat against said second valve seat to isolate said distributor port from said supply inlet port in the bypass position of said control poppet; and one-way flow-control means on said surge head for permitting flow past said surge head from said control chamber to said surge chamber and operable, in response to pressure transmitted to said surge head from said control head, to trap in said surge chamber a body of water resisting movement of said control head away from said control seat when subjected to a surge in said transfer chamber while said second outlet port is closed.

9. A cycling valve as defined in claim 8, wherein said stem connecting said surge head to said control poppet is tubular and has an open end extending through said control poppet, and wherein said check valve has a guide stem slidably guided in said tubular stem for independent axial movements of said control and check valve poppets.

References Cited in the file of this patent
UNITED STATES PATENTS

| | | |
|---|---|---|
| 2,110,758 | Daniels | Mar. 8, 1938 |
| 2,715,098 | Whitlock | Aug. 9, 1955 |
| 2,722,514 | Sloan | Nov. 1, 1955 |
| 2,739,119 | Stoner | Mar. 20, 1956 |
| 2,751,347 | Miller | June 19, 1956 |
| 2,855,944 | Albin | Oct. 14, 1958 |
| 2,880,872 | Albertson | Apr. 7, 1959 |
| 2,959,541 | Cleary | Nov. 8, 1960 |
| 3,063,937 | McAuley | Nov. 13, 1962 |